US010831561B2

(12) United States Patent
Hagiwara et al.

(10) Patent No.: US 10,831,561 B2
(45) Date of Patent: *Nov. 10, 2020

(54) METHOD FOR CHANGING ALLOCATION OF DATA USING SYNCHRONIZATION TOKEN

(71) Applicant: International Business Machines Corporation, Armonk, NY (US)

(72) Inventors: Katsuhiko Hagiwara, Yamato (JP); Junichi Kato, Tokyo (JP); Kumiko Maeda, Tokyo (JP); Yuriko Nishikawa, Tokyo (JP); Chiaki Oishi, Kanagawa (JP); Yutaka Oishi, Kanagawa (JP); Yoshinori Tahara, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 227 days.

This patent is subject to a terminal disclaimer.

(21) Appl. No.: 15/823,806

(22) Filed: Nov. 28, 2017

(65) Prior Publication Data
US 2018/0144018 A1    May 24, 2018

Related U.S. Application Data

(63) Continuation of application No. 15/356,878, filed on Nov. 21, 2016, now Pat. No. 10,394,620.

(51) Int. Cl.
*G06F 9/52* (2006.01)
(52) U.S. Cl.
CPC ..................... *G06F 9/52* (2013.01)
(58) Field of Classification Search
CPC ........................................ G06F 9/52
(Continued)

(56) References Cited

U.S. PATENT DOCUMENTS 5,317,739 A * 5/1994 Elko .................. G06F 9/546
709/216
5,448,734 A * 9/1995 Hrabik ............... G06F 9/544
710/240
(Continued)

FOREIGN PATENT DOCUMENTS

CN    104657202 A    5/2015
WO    2008100361 A1    8/2008

OTHER PUBLICATIONS

Katsuhiko Hagiwara et al., "Method for Changing Allocation of Data Using Synchronization Token," Related Application, U.S. Appl. No. 15/356,878; filed Nov. 21, 2016.
(Continued)

*Primary Examiner* — Shiow-Jy Fan
(74) *Attorney, Agent, or Firm* — Cantor Colburn LLP; Will Stock

(57) ABSTRACT

A technique of operating a system is provided that processes data with one or more data processing modules provided in parallel. A synchronization token is input into at least one data processing module that is in an operational state from the one or more data processing modules provided in parallel, in response to a request to change allocation of the data. The allocation of the data is changed to the one or more data processing modules provided in parallel, after the synchronization token is input. In response to the synchronization token having arrived at a data processing module at a later stage, the at least one data processing module, that stopped the processing, starts processing data after the synchronization token is input to the at least one data processing module.

11 Claims, 11 Drawing Sheets

(58) Field of Classification Search
USPC ............................................................ 707/625
See application file for complete search history.

(56) References Cited

U.S. PATENT DOCUMENTS

| | | | | |
|---|---|---|---|---|
| 6,092,166 | A * | 7/2000 | Bobak | G06F 9/544 709/200 |
| 6,389,482 | B1 * | 5/2002 | Bobak | G06F 9/544 711/169 |
| 6,425,014 | B1 * | 7/2002 | Aiken, Jr. | H04L 29/06 709/230 |
| 6,480,915 | B1 * | 11/2002 | Arimilli | G06F 9/52 370/450 |
| 8,095,782 | B1 * | 1/2012 | Danskin | G06F 9/5088 712/228 |
| 2009/0235254 | A1 * | 9/2009 | Michael | G06F 9/466 718/101 |
| 2012/0131596 | A1 * | 5/2012 | Lefebvre | G06F 9/52 718/106 |
| 2013/0212352 | A1 * | 8/2013 | Anderson | G06F 9/3869 712/1 |
| 2015/0277990 | A1 * | 10/2015 | Xiong | H04L 67/101 718/106 |
| 2016/0203032 | A1 * | 7/2016 | Ozaki | G06F 9/46 718/107 |
| 2018/0143919 | A1 | 5/2018 | Hagiwara et al. | |
| 2018/0143920 | A1 | 5/2018 | Hagiwara et al. | |
| 2018/0144018 | A1 | 5/2018 | Hagiwara et al. | |

OTHER PUBLICATIONS

List of IBM Patents or Patent Applications Treated as Related; (Appendix P), Filed Mar. 2, 2018; pp. 1-2.

* cited by examiner

Method FOR CHANGING ALLOCATION OF DATA USING SYNCHRONIZATION TOKEN

DOMESTIC PRIORITY

This application is a continuation of U.S. application Ser. No. 15/356,878, titled "METHOD FOR CHANGING ALLOCATION OF DATA USING SYNCHRONIZATION TOKEN" filed Nov. 21, 2016, the contents of which are incorporated by reference herein in its entirety.

BACKGROUND

Technical Field

The present invention relates to a method for changing the allocation of data by using a synchronization token.

Related Art

A conventional data pipeline is known to be configured by connecting in series a plurality of components that process data. If the data is input to the data pipeline at a speed that exceeds the data processing speed of a component that has relatively low processing speed, it is possible that a data backlog occurs in the data pipe supplying the data to this component. Therefore, there is an idea of processing pieces of data in parallel by providing an additional component in parallel with this component.

If a setting must be made concerning which components are to be provided in parallel before the data is input to the data pipeline, it is impossible to dynamically change the configuration of the data pipeline according to the increase and decrease in the amount of data to be processed. It should be noted that the amount of data to be processed can fluctuate significantly over time. For example, in a case of data processing in the medical field, the amount of data to be processed fluctuates significantly according to the season, the time of day, whether there is an outbreak of a disease, and the like. Therefore, there is a need for the ability to dynamically change the configuration of a data pipeline in a manner to provide components in parallel while processing the data after the data has been input to the data pipeline.

SUMMARY

According to one or more embodiments of the present invention, provided are a system, a method of operating the system, and a computer program product. The system processes data with one or more data processing modules provided in parallel. The method includes inputting a synchronization token into at least one data processing module that is in an operational state from among the one or more data processing modules provided in parallel, in response to a request to change allocation of the data. The method includes changing the allocation of the data to the one or more data processing modules provided in parallel, after the synchronization token is input. Also, the method includes, in response to the synchronization token having arrived at a data processing module that receives data at a later stage than the at least one data processing module into which the synchronization token was input, processing data for which processing has been stopped by at least one data processing module among the one or more data processing modules after the synchronization token is input to the at least one data processing module, where the processing is by the at least one data processing module that stopped the processing.

The summary clause does not necessarily describe all necessary features of the embodiments of the present invention. The present invention may also be a sub-combination of the features described above.

DETAILED DESCRIPTION

Hereinafter, some embodiments of the present invention will be described. The embodiments do not limit the invention, and all the combinations of the features described in the embodiments are not necessarily essential to means provided by aspects of the invention.

Figure 1:
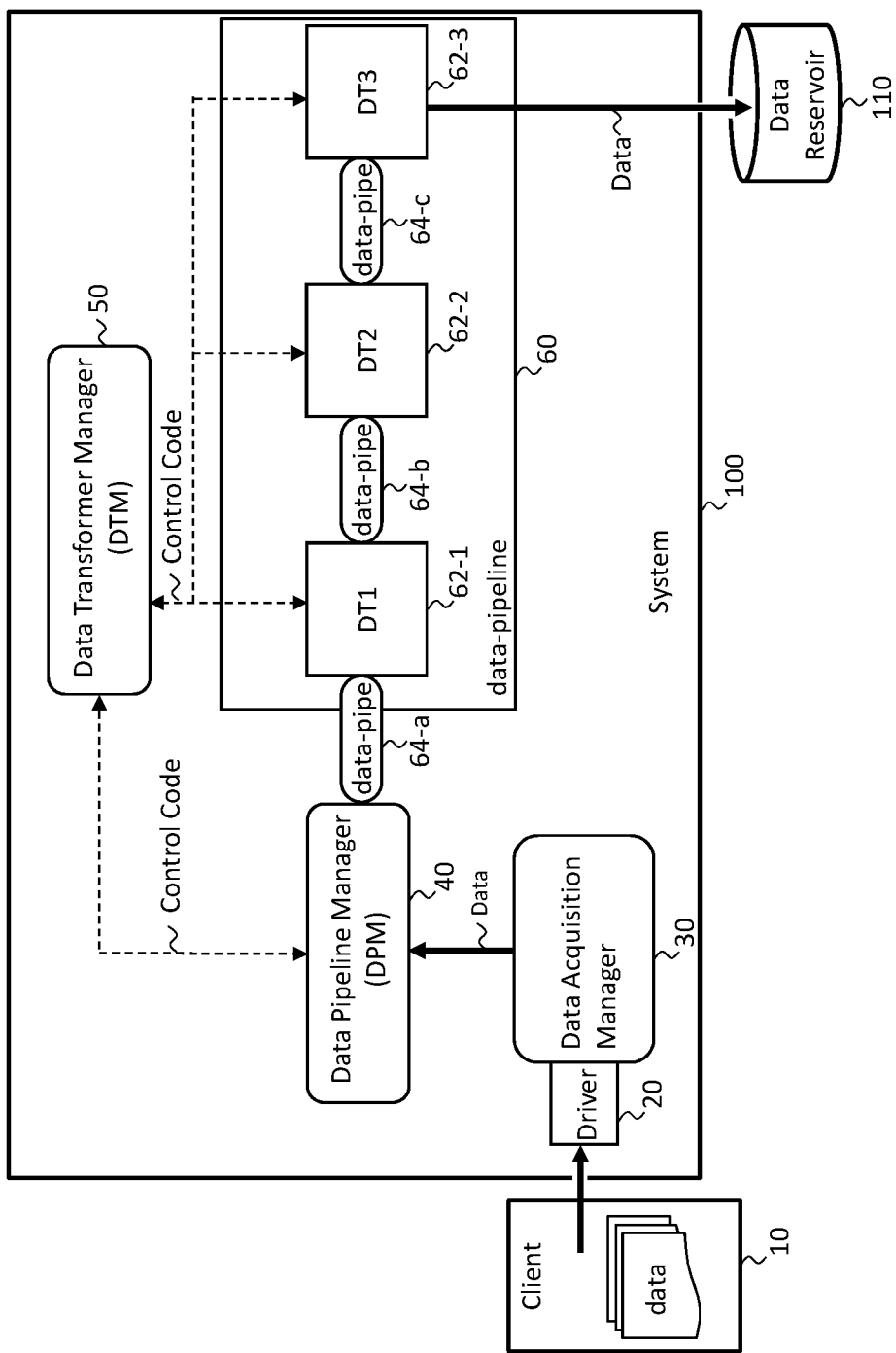
FIG. 1 shows an exemplary configuration of a system according to one or more embodiments.

FIG. 1 shows an exemplary configuration of a system 100 according to an embodiment of the present invention. The system 100 in the present example receives data from a client computer 10, applies a prescribed process to this data, and then stores the processed data in a data accumulating section 110. In FIG. 1, the solid line arrow shows the flow of data that is to be processed or that has been processed, and the dotted line arrow shows the flow of information such as control code.

The system 100 in the present example includes a data acquisition driver 20, a data acquisition manager (DAM) 30, a data pipeline manager (DPM) 40, a data transformer manager (DTM) 50, and a data pipeline 60. The data pipeline 60 may include one or more data pipes 64 and one or more data transformers 62. In FIG. 1, each data transformer (DT) 62 is an example of a data processing module.

The data acquisition manager (DAM) 30 may use the data acquisition driver 20 to manage the client computer 10. The data acquisition manager (DAM) 30 in the present example manages connection and communication between the system 100 and the client computer 10, and acquires data from the client computer 10. In one example, the client computer 10 is a computer installed in a medical institution and the data is medical information and patient information sequentially transmitted from the medical institution, but the present invention is not limited to the present example.

The data acquisition manager (DAM) 30 may absorb the difference in data among a plurality of client computers 10. For example, the data acquisition manager (DAM) 30 absorbs protocol differences and/or data format differences among the client computers 10. In this way, the data acquisition manager (DAM) 30 may transform the data acquired from a client computer 10 into data suitable for processing in the data pipeline 60. The data acquisition manager (DAM) 30 may transmit this converted data to the data pipeline manager (DPM) 40.

The data pipeline manager (DPM) 40 may configure the data pipeline 60 based on information contained in the data. The data pipeline 60 may include one or more data transformers 62 and one or more data pipes 64. The data pipeline manager (DPM) 40 may receive the data from the data acquisition manager (DAM) 30.

A path for exchanging information such as control code may be provided between the data pipeline manager (DPM) 40 and the data transformer manager (DTM) 50. A path for exchanging information such as control code may also be provided between the data transformer manager (DTM) 50 and each data transformer (DT) 62. The data pipeline manager (DPM) 40 may output a request for activating one or more of the data transformers (DT) 62 to the data transformer manager (DTM) 50 via this path. In this way, the data pipeline manager (DPM) 40 may create one or more data transformers (DT) 62.

The data transformer manager (DTM) 50 may manage each data transformer (DT) 62. The data transformer manager (DTM) 50 may activate one or more of the data transformers (DT) 62 according to an activation request from the data pipeline manager (DPM) 40. The data transformer manager (DTM) 50 may check the state of the activated data transformers (DT) 62 via the path. Each data transformer (DT) 62 uses middleware such as an IBM® Integration Bus, Data Stage, Apache Hadoop, or Apache Spark, or a custom java code process called Java® Data Transformer.

Each data transformer 62 may be operable to perform a different predetermined process on the data. Each data transformer 62 may be a processing unit for a processing stage in the data pipeline 60. Each data transformer 62 may require a different amount of time to process the data. The data pipeline 60 may sequentially process the data in the data transformers 62.

The data pipeline manager (DPM) 40 may manage the data pipes 64. The data pipeline manager (DPM) 40 may create the necessary data pipes 64 and delete the unnecessary data pipes 64. Each data pipe 64 may be a logical connection between data transformers (DT) 62. Each data pipe 64 may be realized by a WebSphere MQ or Apache Kafka queue, or may be realized by TCP/IP. Each data pipe 64 may be operable to operate according to the FIFO (First In First Out) operational principle. Each data pipe 64 may be operable to transfer data from one data transformer 62 (or the data pipeline manager (DPM) 40) to another data transformer 62 that is adjacent thereto.

After activation of all of the data transformers (DT) 62 forming the data pipeline 60 has been completed, the data pipeline manager (DPM) 40 may transmit the data to the data pipeline 60. A data transformer (DT1) 62-1 that performs the first process in the data pipeline 60 may receive the data from the data pipeline manager (DPM) 40 via a data pipe 64-a. The data pipe 64-a may also be created or deleted by the data pipeline manager (DPM) 40.

After the data transformer (DT1) 62-1 has performed the prescribed process, a data transformer (DT2) 62-2 may receive the data from the data transformer (DT1) 62-1 via a data pipe 64-b. In this way, each of the data transformers (DT) 62 may sequentially perform the prescribed processes on the data.

The data pipeline 60 in the present example includes three data transformers (DT) 62. The data pipeline 60 in the present example processes the data in the order of the data transformer (DT1) 62-1, the data transformer (DT2) 62-2, and a data transformer (DT3) 62-3. However, it should be noted that the number of data transformers 62 included in the data pipeline 60 is not limited to three. The number of data transformers 62 may be greater than or equal to one.

In the present example, the data acquisition manager (DAM) 30, the data pipeline manager (DPM) 40, the data transformer manager (DTM) 50, the data transformers (DT) 62, and the data pipes 64 are all provided in the same computer (e.g., system 100), but one or more of these components may instead be provided in a different computer, or each of these components may be provided in a different computer. Furthermore, the data pipeline manager (DPM) 40 and one or more of the data transformers (DT) 62 may be provided in different computers. The one or more computers may be provided by a cloud environment. The one or more computers may be servers. The computers may be connected to each other by a network. In this case as well, the data pipes 64 can be suitably connected to the data transformers (DT) 62 in order to form the data pipeline 60.

In the manner described above, the amount of data to be processed fluctuates significantly over time. Therefore, there is an idea to prepare in advance, in a cloud environment, a number of data transformers (DT) 62 that are capable of processing an envisioned maximum data amount without delay. However, when a number of data transformers (DT) 62 greater than the number needed to process the data are activated in advance, this occupies a needlessly excessive amount of the servers. This is undesirable from the viewpoint of cost competitiveness. Therefore, there is a need for the ability to process the data using a suitable number of the data transformers (DT) 62 corresponding to the increase and decrease in the amount of data to be processed.

In the state-of-the-art, there exists parallel variance systems such as MapReduce by Google®, Apache Hadoop MapReduce, Apache Spark, Apache Kafka, IBM® InfoSphere Datastage, Informatica PowerCenter, and the like, and also a parallel processing system for data using ETL (Extract, Transform & Load). In these systems, at least before the data processing is started, a determination must be made concerning how many data transformers (DT) provided in parallel the data will be allocated, i.e., the number of partitions, and input to the partitions. The partition number N (where N is a natural number) means that N data transformers (DT) are provided in parallel.

Specifically, in the state-of-the-art (such as MapReduce by Google®, Apache Hadoop MapReduce, IBM® InfoSphere Datastage, and Informatica PowerCenter), the number of partitions is fixed when a job is started. In Apache Spark, the number of partitions is fixed when a data set is created. In Apache Kafka, the number of partitions is fixed when a message group, referred to as a topic, is created. In other words, in the existing systems in the state-of-the-art, once the data processing by the data transformers (DT) is started, it is impossible to dynamically change the number of partitions without stopping the data processing.

Figure 2A:
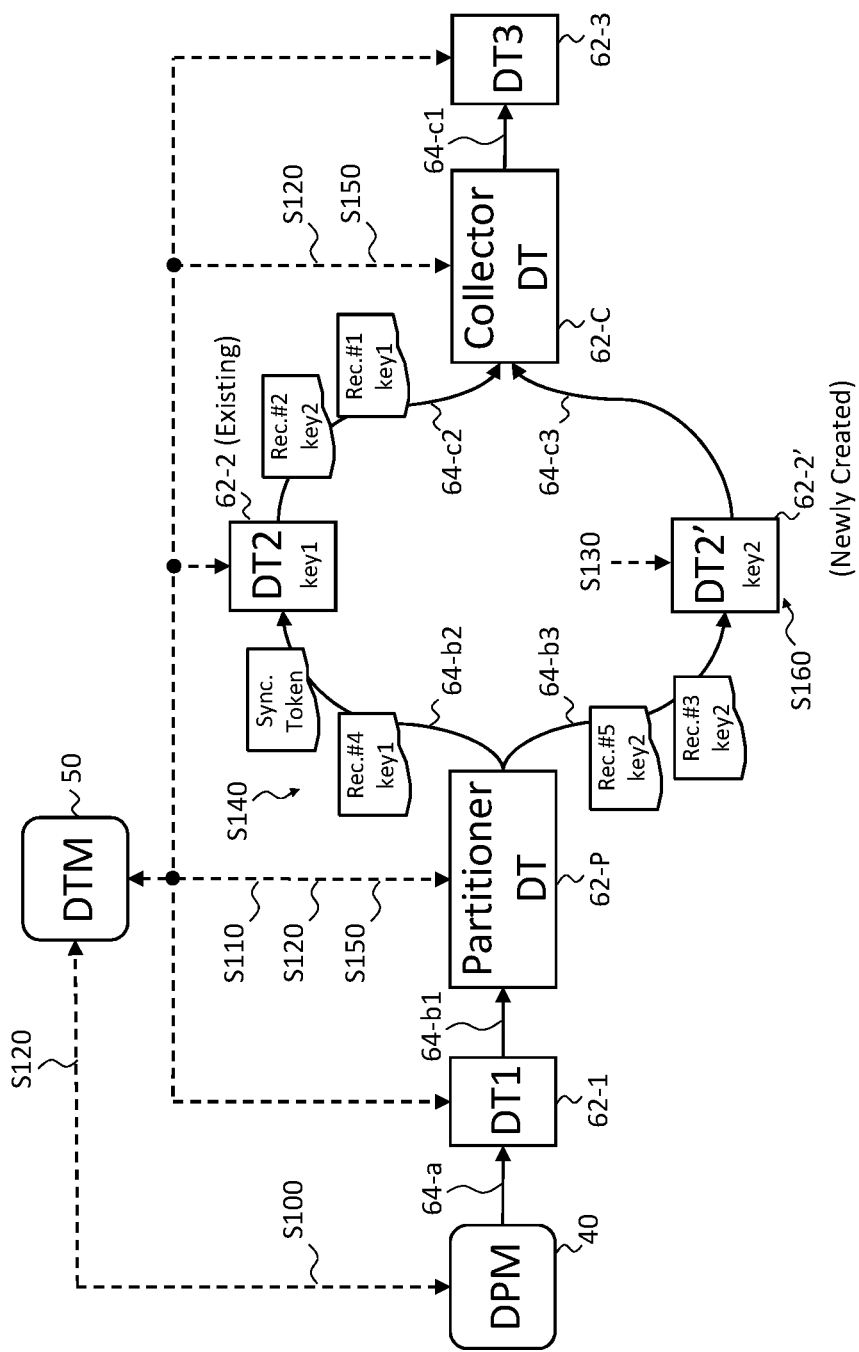
FIG. 2A shows a change of the portioning of the data according to one or more embodiments.

FIG. 2A shows a change of the portioning of the data according to the one or more embodiments. In the present example, the data pipeline manager (DPM) 40 changes the number of partitions of the data transformer (DT2) 62-2. In the present example, the data pipeline manager (DPM) 40 newly creates a data transformer (DT2') 62-2' and adds this data transformer (DT2') 62-2' in parallel with the existing data transformer (DT2) 62-2. As a result, it is possible to input one portion of the data into the data transformer (DT2) 62-2 and another portion of the data into the data transformer (DT2') 62-2'. In the present example, the data transformers (DT) 62 provided in parallel perform the same processes on the data, but as another example, these data transformers (DT) 62 may perform different processes.

In the present example, a unit resulting from the data being divided into prescribed lengths is referred to as a record. Each record may include information concerning the processing order and a key value indicating a group to which the record belongs. In FIG. 2A, the information concerning the processing order is indicated by the # symbol and a number. Furthermore, each key value is expressed by the characters "key" and a number. In the present example, the key value itself is the number attached to the right side of the characters "key." One or more records in each of one or more groups may have an order in which this record is to be processed within the group determined for this record. In the present example, records having the same key value are processed in order from the smaller number following the #.

Each record in the present example is initially scheduled to be processed by the respective data transformer (DT) 62 in the order of #1, #2, . . . , #5. Therefore, the records are input to the data transformers (DT) 62 in the order of #1, #2, . . . , #5. It should be noted that, since the processing order is maintained within each group, records having the same key value need only be processed in order according to the processing order. In the present example, records #1 and #4 having key1 are processed in this order. Furthermore, in the present example, records #2, #3, and #5 having key2 are processed in this order.

As made clear from the above description, records in different groups, i.e., records with different key values, do not necessarily need to be processed according to the processing order. In the present example, record #4 having key1 is processed by the data transformer (DT2) 62-2 before record #3 having key2 is processed by the data transformer (DT2') 62-2'.

If the data processed in the system 100 is patient information and medical information transmitted from a medical institution, the key value may be a patient ID. In other words, the data pipeline 60 may maintain the processing order of the records as long as the key values are the same, i.e., the patient IDs are the same.

Each data transformer (DT) 62 may be operable to receive a record from one data pipe 64, and may be operable to transmit a record to another data pipe 64. Each data transformer (DT) 62 may be operable to monitor a processing state of the records. In one example, although one or more embodiments of the present invention are not limited to this example, each data transformer (DT) 62 may monitor items (i) to (iii) described below. Here, (i) is the time during which the records are backlogged in a data pipe 64, (ii) is the number of records backlogged in a data pipe 64, and (iii) is the time from when the processing of one record is finished by a data transformer (DT) 62 to when the processing of the next record is started by this data transformer (DT) 62, i.e., the time that the data transform (DT) 62 waits until the arrival of the next record to be processed.

If any one of the time of (i) and the number of (ii) exceeds a prescribed threshold value (known in advance), the data transformer (DT) 62 may judge that records are backlogged in the data pipe 64. The data transformer (DT) 62 may transmit information indicating that the records are backlogged in the data pipe 64 to the data pipeline manager (DPM) 40 via the data transformer manager (DTM) 50. The data pipeline manager (DPM) 40 may treat the information concerning the record backlog as a request to change the allocation of the data by increasing the number of partitions (S100). Instead of this, a manager of the system 100 may, upon seeing this information, output to the data pipeline manager (DPM) 40 a request to change the allocation of the data by increasing the number of partitions.

If the time of (iii) exceeds the prescribed threshold value, the data transformer (DT) 62 may judge that this data transformer 62 is in an idle state. The data transformer (DT) 62 may transmit information indicating that the data transformer (DT) 62 is in the idle state to the data pipeline manager (DPM) 40, via the data transformer manager (DTM) 50. The data pipeline manager (DPM) 40 may treat the information indicating that the data transformer (DT) 62 is in the idle state as a request to change the allocation of the data by decreasing the number of partitions (S100). As another option, the manager of the system 100 may, upon seeing this information, output to the data pipeline manager (DPM) 40 a request to change the allocation of the data by decreasing the number of partitions.

Furthermore, the data pipeline manager (DPM) 40 may receive (i) to (iii) described above and treat the received information as a request for changing the allocation of the data to existing data transformers (DT) 62 without changing the number of partitions (S100). Instead, the manager of the system 100 may output a request to change the allocation of the data.

The data pipeline manager (DPM) 40 may change the number of partitions of a data transformer (DT) 62 in response to the request to change the allocation of the data. In the present embodiment, it is assumed that the data processing in the existing data transformer (DT2) 62-2 takes time and a record backlog occurs in the data pipe 64-b. The data pipeline manager (DPM) 40 in the present example receives information indicating that there is a record backlog in the data pipe 64-b, and increases the number of partitions of the data transformer (DT2) 62-2. In this way, the allocation of the data is changed. In the present example, the number of partitions of the data transformer (DT2) 62-2 is changed from 1 (i.e., only the data transformer (DT2) 62-2 (FIG. 1)) to 2 (the data transformers (DT2 and DT2') 62-2 and 62-2' (FIG. 2A)).

After S100, the data transformer manager (DTM) 50 may check whether there is a data transformer (DT) 62 (labeled as the partitioner DT62-P) for allocating data located at a stage before the data transformer (DT) 62 for which the number of partitions is being changed (S110). The data transformer manager (DTM) 50 in the present example checks whether the partitioner DT62-P is located before the data transformer (DT2) 62-2 and after the data transformer (DT1) 62-1.

The partitioner DT62-P may be a hash-partitioner that uses a remainder resulting from the key value being divided by the number of partitions. Before and after the calculation by the hash-partitioner, the key value before the calculation and the key value after the calculation may be uniquely associated. The key value after the calculation is generally referred to as a hash value, but in the present embodiment the key value after the calculation is still referred to as a key value in order to simplify the description.

The hash-partitioner may input records having the same remainder to the same data transformer (DT) 62. In other words, the hash-partitioner may input records having the same key values to the same data transformer (DT) 62. After the calculation, the hash-partitioner in the present example can allocate each record such that records having key1 are input to the data transformer (DT1) 62-1 and records having key2 are input to the data transformer (DT2) 62-2.

In another example, the partitioner DT62-P may be a round-robin-partitioner that allocates values in order according to the input values of the records, or may be a partitioner based on another calculation technique. These partitioners may also input records having the same key values into the same data transformer (DT) 62.

If the partitioner DT62-P is not present at S110, the data pipeline manager (DPM) 40 may add the partitioner DT62-P and a collector DT62-C, via the data transformer manager (DTM) 50 (S120). The collector DT62-C may be a data transformer (DT) 62 for collecting the data that has been allocated, at a stage after the existing data transformers (DT) 62.

If the partitioner DT62-P and the collector DT62-C are added at S120, or if the partitioner DT62-P already exists at S110 (a case in which the partitioner DT62-P already exists can be treated as a case where the collector DT62-C also already exists), the data transformer manager (DTM) 50 may activate the new data transformer (DT) 62 (S130). In this way, the new data transformer (DT) 62 may be added in parallel with the existing data transformer (DT) 62. If a plurality of data transformers (DT) 62 already exist, the new data transformer (DT) 62 may be added in parallel with the existing plurality of data transformers (DT) 62. Furthermore, a plurality of new data transformers (DT) 62 may be added in parallel with one or more existing data transformers (DT) 62.

In addition, the data pipeline manager (DPM) 40 in this example creates the data pipes 64-$b1$, 64-$b2$, and 64-$b3$ (S130). The data pipe 64-$b1$ in the present example connects a data transformer (DT) 62 and the partitioner DT62-P. The data pipe 64-$b2$ in the present example connects the partitioner DT62-P and the existing data transformer (DT2) 62-2. The data pipe 64-$b3$ in the present example connects the partitioner DT62-P and the newly added data transformer (DT2') 62-2'. Furthermore, the data pipeline manager (DPM) 40 in the present example deletes the existing data pipe 64-$b$.

The data pipeline manager (DPM) 40 in the present example creates data pipes 64-$c1$, 64-$c2$, and 64-$c3$ in the same manner. The data pipe 64-$c1$ in the present example connects a data transformer (DT3) 62-3 and the collector DT62-C. The data pipe 64-$c2$ in the present example connects the collector DT62-C and the existing data transformer (DT2) 62-2. The data pipe 64-$c3$ in the present example connects the collector DT62-C and the newly added data transformer (DT2') 62-2'. Furthermore, the data pipeline manager (DPM) 40 in the present example deletes the existing data pipe 64-$c$.

After (in response to) S130, the partitioner DT62-P may input a synchronization token, via a data pipe 64, into at least one data transformer (DT) 62 that is in an operational state, from among one or more data transformers (DT) 62 provided in parallel (S140). In the present example, the operational state refers to a state in which the data transformer (DT) 62 to which the data is input is capable of processing the data. In the present example, at least the existing data transformer (DT2) 62-2 is in the operational state. In the present example, the partitioner DT62-P inputs a synchronization token into the existing data transformer (DT2) 62-2. The synchronization token may be a token that can be treated as data in the same manner as the records.

The data transformer (DT) 62 in the operational state can receive the synchronization token from the data pipe 64 while successively processing the data using a processing thread. In other words, the data transformer (DT) 62 in the operational state can, after processing a record, continue on to sequentially read the synchronization token and the record following after this synchronization token without stopping. Therefore, in the present example, there is no need to stop the operation of the data transformer (DT) 62 in the operational state. Accordingly, the data transformer (D2T) 62-2 in the operational state can, after processing records #1 and #2, continue on to sequentially read the synchronization token and record #4 without stopping. In the present example, in this way, even after data has been input to the data pipeline 60, it is possible to dynamically change the configuration of a data transformer (DT) 62.

If one or more data transformers (DT) 62 already exist and one or more new data transformers (DT) 62 are newly added in parallel with these one or more existing data transformers (DT) 62, the partitioner DT62-P may input the synchronization token to all of the one or more existing data transformers (DT) 62. It should be noted that the partitioner DT62-P does not input the synchronization token to the one or more newly created data transformers (DT) 62.

The synchronization token may include ID (identification) information indicating the key value of a record being processed by a data transformer (DT) 62. The synchronization token in the present example includes ID information indicating that the key value of the record being processed by the data transformer (DT2) 62-2 is 1.

After inputting the synchronization token into the one or more existing data transformers (DT) 62, the partitioner DT62-P may change the allocation of the data for the one or more data transformers (DT) 62 provided in parallel. The partitioner DT62-P may allocate a key value for each single data transformer (DT) 62 among the one or more data transformers (DT) 62 provided in parallel. Furthermore, a plurality of key values may be allocated to a single data transformer (DT) 62.

After inputting the synchronization token to the data transformer (DT2) 62-2, the partitioner DT62-P in the present example allocates key1 to the data transformer (DT2) 62-2 and allocates key2 to the data transformer (DT2') 62-2'. In this way, the partitioner DT62-P may allocate a record corresponding to the key value to each data transformer (DT) 62.

Furthermore, the partitioner DT62-P may change the allocation of the data by allocating some key values among a plurality of key values processed by the existing data transformers (DT) 62 to the added data transformers (DT) 62. In the present example, the data allocation is changed by allocating key2, from among key1 and key2 processed by the existing data transformer (DT2) 62-2, to the (newly) added data transformer (DT2') 62-2'.

In the key value allocation described above, the existing data transformers (DT) 62 may stay in the operational state of being able to process data. In the present example, the existing data transformer (DT2) 62-2 stays in the operational state. If one or more existing data transformers (DT) 62 are provided in parallel, the one or more data transformers (DT) 62 may stay in the operational state of being able to process data. It should be noted that, even for an existing data transformer (DT) 62, if the key value of a record to be processed has been changed before and after the change of the allocation of the records, there are cases where the data processing must be stopped.

The partitioner DT62-P may compare (a) the key value of a record to be processed by the data transformer (DT2) 62-2 "before" the change of the data allocation to (b) the key value of the record processed by the data transformer (DT2) 62-2 "after" the change of the data allocation.

If (a) and (b) are completely matching (Case A) or if (a) contains (b) (Case B), the partitioner DT62-P may continue inputting records into the data transformer (DT) 62 that was processing records before the change. The data transformer (DT) 62 may continue the data processing. Here, the case where (a) contains (b) means that the number and types of key values in (a) are greater than the number and types of key values in (b).

In contrast, in cases other than (Case A) and (Case B), the partitioner DT62-P causes a record backlog in the data pipe 64 between the partitioner DT62-P and the data transformer 62 to which the records are to be sent, and the data transformer (DT) 62 stops the data processing. Cases other than (Case A) and (Case B) include, for example, a case where (a) and (b) have a different number and different types of key values (Case C), a case where (a) and (b) have the same number of key values but different types of key values (Case D), and a case where (b) contains (a) (Case E).

The number of key values refers to the number of different types of key values. For example, the number of key values is 2 when key1 and key 2 are included, and the number of key values is 3 when key1, key2, and key3 are included. Furthermore, if a record including key1, key2, and key3 is processed by a data transformer (DT) 62 "before" the change of the data allocation and a record including key4, key2, and key6 is processed by the data transformer (DT) 62 "after" the change of the data allocation, the number of key values is the same, i.e. 3, before and after the change, but the types of key values are different before and after the change.

In (Case C) and (Case D), the data transformer (DT) 62 does not read the records, and therefore the processing of the records is temporarily stopped. The data transformer (DT) 62 that is in the stopped state is not in the operational state. This is in order to ensure the processing order for the records having the same key values. A case in which a data transformer (DT) 62 is newly added in accordance with the change of the data allocation corresponds to (Case E). In (Case E) as well, the newly added data transformer (DT) 62 temporarily stops the record processing in order to ensure the additional processing order.

In this way, after the synchronization token has been input to the data transformer (DT) 62, the data processing performed by at least one data transformer (DT) 62 among the one or more data transformers (DT) 62 provided in parallel may be stopped. In the present example, the newly added data transformer (DT2') 62-2' does not start processing data until the synchronization token arrives at the collector DT62-C. In this way, it is possible to prevent record #3 including key2 from being input to the collector DT62-C before record #2 having key2. Therefore, it is possible to ensure the processing order for the same key values.

After the synchronization token is input to the data transformer (DT2) 62-2, the partitioner DT62-P in the present example sequentially inputs records #3 and #5 having key2 into the data pipe 64-b3. The data transformer (DT2') 62-2' may have its own dedicated queue. The data transformer (DT2') 62-2' in the present example may hold records #3 and #5 including key2 in its own dedicated queue. The data transformer (DT2') 62-2' in the present example then temporarily stops the record processing itself.

A data transformer (DT) 62 at an earlier stage than the collector DT62-C may check whether the collector DT62-C has acquired one or more synchronization tokens (S150). The collector DT62-C in the present example provides notification to the data pipeline manager (DPM) 40, via the data transformer manager (DTM) 50, including the ID information indicating the key values of the records to be processed by the data transformer (DT) 62 that acquired the synchronization token. Furthermore, the data pipeline manager (DPM) 40 in this example provides notification including this ID information to the data transformer (DT2') 62-2' via the data transformer manager (DTM) 50. In this way, the data transformer (DT2') 62-2' can provide notification that the synchronization token has reached the collector DT62-C.

In response to the synchronization token arriving at the collector DT62-C, data processing may be performed by at least one data transformer (DT) 62 (S160). In the present embodiment, after the data transformer (DT2') 62-2' becomes aware that the synchronization token has arrived at the collector DT62-C, the data transformer (DT2') 62-2' starts the record processing that was temporarily stopped. In this way, it is possible to ensure the data processing order.

In the present example, the synchronization token arrives at the collector DT62-C without any processing being performed at the data transformer (DT2) 62-2. It should be noted that, as another example, if the collector DT62-C can be made aware of the ID information described above, some kind of processing may be performed on the synchronization token. As a result of this additional processing, additional information may be included in the synchronization token.

Figure 2B:
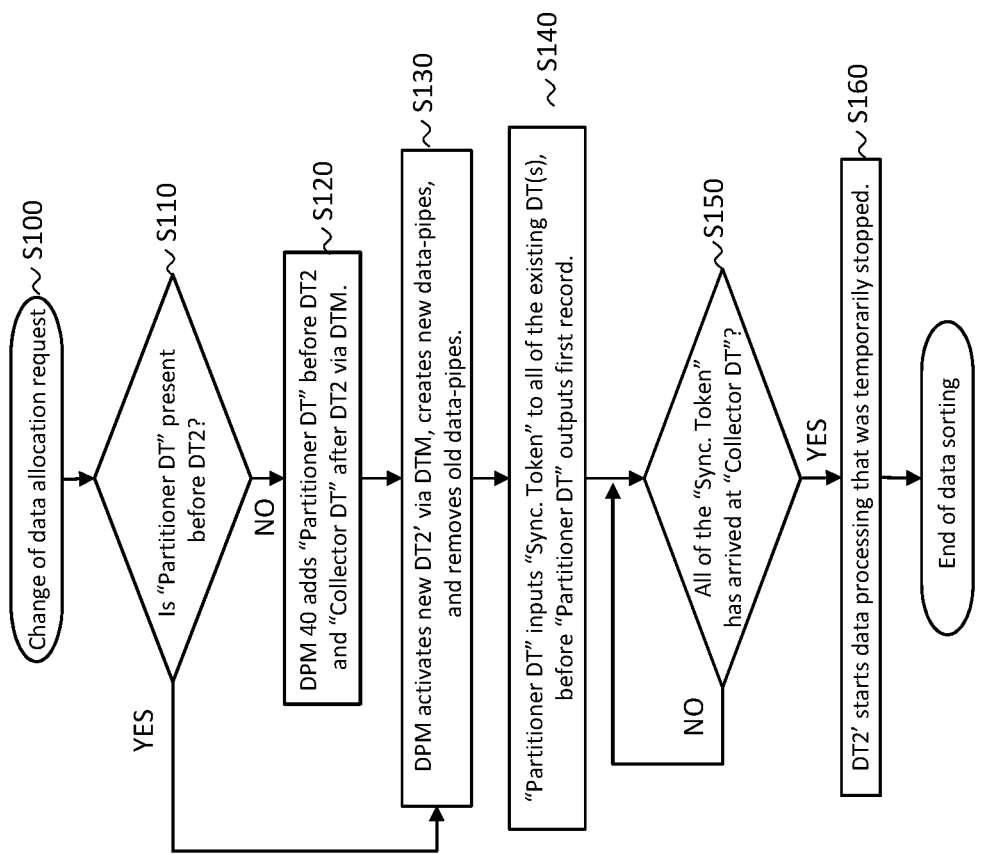
FIG. 2B shows an operational flow for changing the data allocation according to one or more embodiments.

FIG. 2B shows an operational flow for changing the data allocation according to the present embodiment. In FIG. 2B, the procedure described in FIG. 2A is described using a flow chart. Here, S100 to S160 correspond to S100 to S160 in FIG. 2A. Furthermore, S100 to S160 may be performed in this order.

The change of the data allocation in the system 100 is started by having the data pipeline manager (DPM) 40 receive the request to change the data allocation (S100). If the data transformer (DT2) 62-2 changes the number of partitions, the data transformer manager (DTM) 50 checks whether the partitioner DT62-P is present at a stage before the data transformer (DT2) 62-2 (S110).

If the partitioner DT62-P is not present (NO at S110), the data pipeline manager (DPM) 40 adds the partitioner DT62-P and the collector DT62-C(S120). On the other hand, if the partitioner DT62-P is present (YES at S110), the process moves to S130.

The data pipeline manager (DPM) 40 adds and activates the new data transformer (DT2') 62-2' via the data transformer manager (DTM) 50. Furthermore, the data pipeline manager (DPM) 40 creates all of the data pipes 64 connecting the partitioner DT62-P and the collector DT62-C to the existing data transformers (DT2) 62-2 and the new data transformer (DT2') 62-2', and deletes the existing data pipes 64 (S130).

The partitioner DT62-P inputs the synchronization token to all of the existing data transformers (DT) 62, before outputting the first record (S140). In present example, only data transformer (DT2) 62-2 is all of the existing data transformers (DT) 62. At least one of the existing data transformers (DT) 62 may be in the operational state. In present example, data transformer (DT2) 62-2 is in the operational state. The data pipeline manager (DPM) 40 checks whether this synchronization token has arrived at the collector DT62-C(S150).

If all of the synchronization tokens have arrived at the collector DT62-C (YES at S150), the data transformer (DT2') 62-2' starts the data processing that was temporarily stopped (S160). On the other hand, if all of the synchronization tokens have not yet arrived at the collector DT62-C (NO at S150), the collector DT62-C waits for the synchronization tokens that have not yet arrived. The data processing by the data transformer (DT2') 62-2' remains stopped while the collector DT62-C waits for the arrival of the synchronization tokens.

In the example described above, one data transformer (DT2') 62-2' is added in parallel with the existing data transformer (DT2) 62-2, but two or more data transformers (DT) 62 may be newly added instead. In other words, the number of partitions of the data transformer (DT2) 62-2 may be 3 or more. In this case as well, the change of the data allocation described above can be applied. Furthermore, the adding of data transformers (DT) 62 is not limited to the data transformer (DT2) 62-2, and new data transformers (DT) 62 may be added in parallel with any of the data transformers (DT) 62.

The change of the data allocation is considered mainly in the four examples described below, although the one or more embodiments of the present invention are not limited to these examples. In the following four examples, in order to simplify the description of the change of the data allocation, the description uses only the key values allocated to a data transformer (DT) 62.

The first, second, and third examples are examples in which a new data transformer (DT) 62 is "created," and the fourth example is an example in which a new data transformer (DT) 62 is "not created." The fourth example is also an example in which the existing data transformers (DT 62) are stopped. These four examples are merely examples, and it is obvious that data allocation change may be applied to other examples. The data allocation may be changed using a combination of any two or more of these four examples. The following description using the data transformer (DT2) 62-2 is intended to facilitate understanding, and does not limit embodiments of the present invention in any way. The number of key values is 2 in FIG. 2A and FIG. 2B, but the number of key values is 6 in the following four examples.

In the first example, (i) the data transformer (DT2) 62-2 already exists, (ii) the data transformer (DT2') 62-2' is newly created, (iii) data is allocated only to the data transformer (DT2) 62-2 "before" the change of the data allocation, and (iv) data is allocated to the data transformer (DT2) 62-2 and the data transformer (DT2') 62-2' "after" the change of the data allocation. This data allocation example is shown in "Table 1."

TABLE 1

| DT | Before | After |
|---|---|---|
| DT2 (Existing) | key1, key2, . . . , key6 | key1, key2, key3 |
| DT2' (Newly Created) | — | key4, key5, key6 |

The data transformer (DT2) 62-2 corresponds to (Case B) described above. The data transformer (DT2') 62-2' corresponds to (Case E) described above.

In the second example, (i) the data transformers (DT2 and DT2') 62-2 and 62-2' already exist, (ii) a data transformer (DT2") 62-2" is newly created, (iii) data is allocated only to the data transformers (DT2 and DT2') 62-2 and 62-2' "before" the change of the data allocation, and (iv) data is allocated to the data transformers (DT2, DT2', and DT2") 62-2, 62-2', and 62-2" "after" the change of the data allocation. This data allocation example is shown in "Table 2."

TABLE 2

| DT | Before | After |
|---|---|---|
| DT2 (Existing) | key1, key 2, key3 | key1, key2 |
| DT2' (Existing) | key4, key5, key6 | key3 |
| DT2" (Newly Created) | — | key4, key5, key6 |

The data transformer (DT2) 62-2 corresponds to (Case B) described above. The data transformer (DT2') 62-2' corresponds to (Case C) described above. The data transformer (DT2") 62-2" corresponds to (Case E) described above.

In the data transformer (DT2) 62-2, key values that were not allocated "before" the change of the data allocation are not newly allocated "after" the change of data allocation. In other words, a portion of the key values (i.e., key1 and key2) that were allocated "before" the change of the data allocation are allocated "after" the change of the data allocation as well.

In the data transformer (DT2) 62-2 of the present example, records having the same key values are not overtaken before and after the change of the data allocation. Therefore, the data transformer (DT2) 62-2 stays in the operational state. In other words, the data transformer (DT2) 62-2 does not stop the record processing.

In contrast, in the data transformer (DT2') 62-2', key values that were not allocated "before" the change of the data allocation are newly allocated "after" the change of data allocation. In other words, records having different key values are allocated to the data transformer (DT2') 62-2' before and after the change of the data allocation. In this case, when processing of the record having key3 by the data transformer (DT2') 62-2' continues even "after" the change of the data allocation, there is a possibility that a record having key3 processed by the data transformer (DT2) 62-2 "before" the change of data allocation is input to the collector DT62-C first. In other words, there is a possibility that a record is overtaken. Therefore, the data transformer (DT2') 62-2' stops the record processing until the collector DT62-C acquires the synchronization token. Furthermore, in the same manner, the data transformer (DT2") 62-2" stops the record processing until the collector DT62-C acquires the synchronization token.

In the third example, (i) the data transformers (DT2 and DT2') 62-2 and 62-2' already exist, (ii) a data transformer (DT2") 62-2" is newly created, (iii) a plurality of key values are allocated respectively to the data transformers (DT2 and DT2') 62-2 and 62-2' "before" the change of the data allocation, and (iv) some of the key values from "before" the change are allocated to the data transformer (DT2) 62-2, some of key values corresponding to the data transformer (DT2) 62-2 are newly allocated to the data transformer (DT2') 62-2' as key values, and key values are newly allocated to the data transformer (DT2') 62-2' "after" the change of the data allocation. This data allocation example is shown in "Table 3." The data transformer (DT2) 62-2 corresponds to (Case B) described above, the data transformer (DT2') 62-2' corresponds to (Case D) described above, and the data transformer (DT2") 62-2" corresponds to (Case E) described above.

TABLE 3

| DT | Before | After |
|---|---|---|
| DT2 (Existing) | key1, key 3, key5 | key1, key3 |
| DT2' (Existing) | key2, key4, key6 | Key2, key5, key6 |
| DT2" (Newly Created) | — | key4 |

Specifically, "before" the change of the data allocation, key1, key3, and key5 are allocated to the data transformer (DT2) 62-2 and key2, key4, and key6 are allocated to the data transformer (DT2') 62-2'. However, "after" the change of the data allocation, key5 corresponding to the data transformer (DT2) 62-2 is newly allocated as the key value corresponding to the data transformer (DT2') 62-2'. In contrast, key4 corresponding to the data transformer (DT2') 62-2' is newly allocated as the key value corresponding to the data transformer (DT2") 62-2".

In the present example, the data transformer (DT2) 62-2 and the data transformer (DT2') 62-2' are existing data transformers (DT) 62, and therefore the partitioner DT62-P inputs the synchronization token to both of these data transformers (DT) 62. In this example, the data transformer (DT2) 62-2 stays in the operational state of being able to process data. However, when the data transformer (DT2') 62-2' continues processing the record including key5 even "after" the change of the data allocation, there is a possibility that a record having key2 processed by the data transformer (DT2) 62-2 "before" the change of the data allocation is overtaken. Therefore, "after" the change of the data allocation, the data transformer (DT2') 62-2' does not start the data processing until the synchronization token arrives at the collector DT62-C. Furthermore, data transformer (DT2") 62-2" corresponds to (Case E), and therefore temporarily stops the record processing.

In the fourth example, (i) the data transformers (DT2 and DT2') 62-2 and 62-2' already exist, (ii) a data transformer (DT) 62 is not newly created in parallel, (iii) a plurality of key values are allocated respectively to the data transformer (DT2) 62-2 and the data transformer (DT2') 62-2' "before" the change of the data allocation, and (iv) records are transmitted only to the data transformer (DT2) 62-2, records are not transmitted to the data transformer (DT2') 62-2', and the data transformer (DT2') 62-2' stops the record processing "after" the change of the data allocation. This data allocation example is shown in "Table 4."

TABLE 4

| DT | Before | After |
|---|---|---|
| DT2 (Existing) | key1, key2, key3 | key1, key2, . . . , key6 |
| DT2' (Existing) | key4, key5, key6 | (stop) |

In this example, the plurality of key values allocated to the two data transformers (DT) 62 provided in parallel before the change of the data allocation are newly allocated as key values corresponding to a second number (1), which is less than a first number (2), of data transformers (DT) 62 after the change of the data allocation. It is obvious that the synchronization token may be input to the second number (1) of data transformers (DT) 62.

The data transformer (DT2) 62-2 corresponds to (Case E). It should be noted that the data transformer (DT2') 62-2' does not correspond to any of (Case A) to (Case E) described above. In the present example, record overtaking does not occur among records having the same key values. Therefore, it is clear that the data transformer (DT2) 62-2 may continue the processing.

In the four examples described above, the number of data transformers (DT) 62 provided in parallel before the change of the data allocation may be greater than or equal to three. Furthermore, the number of data transformers (DT) 62 after the change of the data allocation may be greater than or less than the number of data transformers (DT) 62 before the change of the data allocation.

The change of the data allocation may be performed on one computer (e.g. a server) or may be performed among different computers. Specifically, if a data transformer (DT) 62 and a data transformer (DT') 62' are provided in parallel, the data transformer (DT) 62 may operate on a first computer and the data transformer (DT') 62' may operate on a second computer that is different from the first computer. The data allocation may be changed by newly allocating a portion of the key values corresponding to the data transformer (DT) 62 as key values corresponding to the data transformer (DT') 62'.

If the change of the data allocation is performed among different computers, the data pipeline manager (DPM) 40 may provision a new computer. The provisioning process may be performed independently from the process for changing the number of partitions. The data pipeline manager (DPM) 40 may register a computer for which the provisioning has been completed as a node to which a data transformer (DT) 62 can be added.

It is obvious that, in the first or second computer, two or more data transformers (DT) 62 may be provided in parallel. Furthermore, a plurality of data transformers (DT) 62 may be provided in parallel in three or more different computers.

Figure 3A:
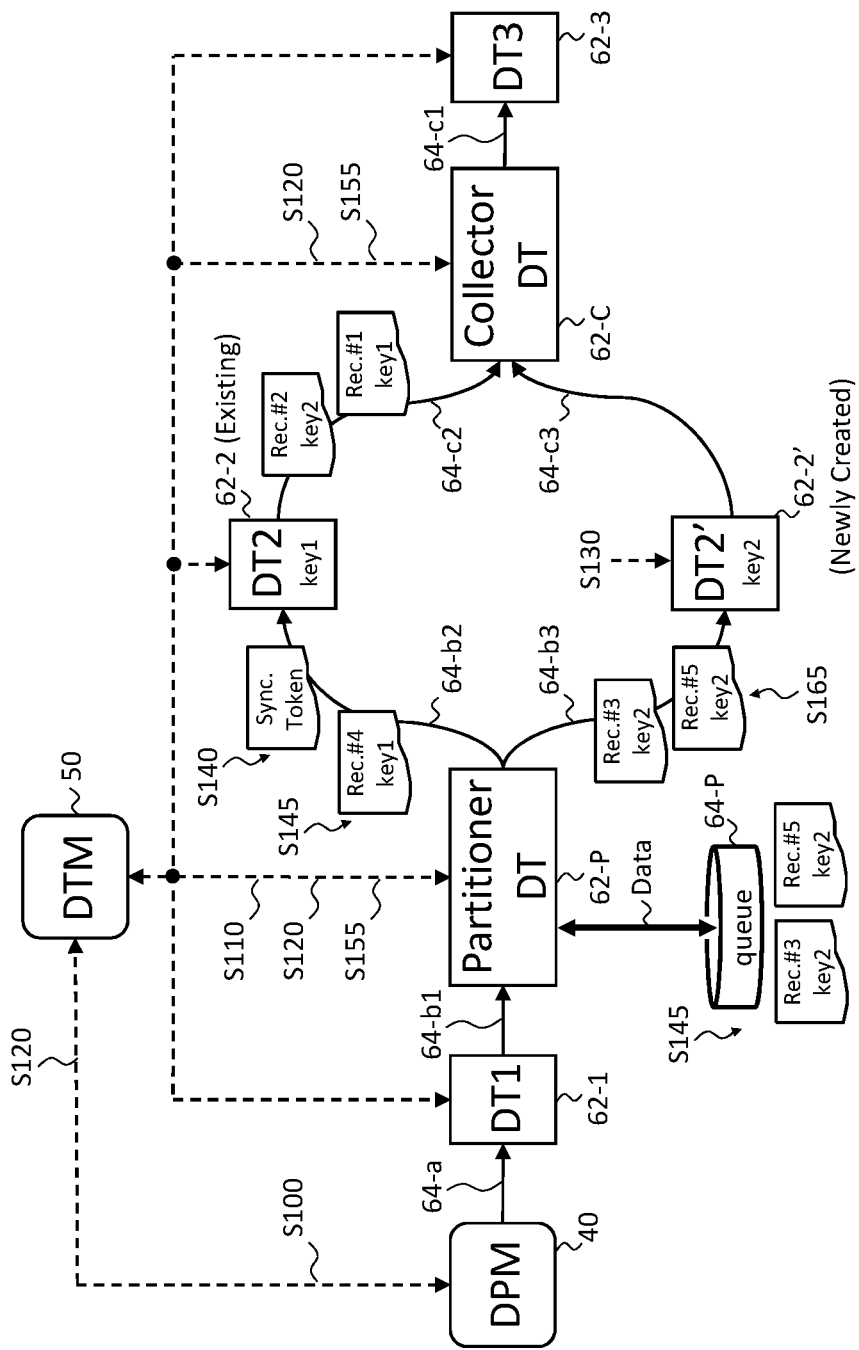
FIG. 3A shows a first modification of the change of the data allocation according to one or more embodiments.

FIG. 3A shows a first modification of the change of the data allocation according to one or more embodiments. In the present example, the description focuses mainly on the differences relative to FIG. 2A. In the system 100 of the present example, the partitioner DT62-P includes a data pipe 64-P. The partitioner DT62-P uses the data pipe 64-P to control the order in which the data is input to the data transformers (DT) 62. The present example differs from the example shown in FIG. 2A and FIG. 2B mainly with regard to these points. Due to these differences, the present example further includes S145 and includes S155 and S165 instead of S150 and S160. The process from S100 to S140 in the present example may be the same as in FIG. 2A and FIG. 2B.

The data pipe 64-P may differ from the data pipe 64 connecting the partitioner DT62-P and the data transformer (DT) 62. The data pipe 64 in the present example is a dedicated data pipe 64 for the partitioner DT62-P. The data pipe 64-P may be a logical connection. The data pipe 64-P may be realized by a queue such as WebSphere MQ and Apache Kafka.

In the present example, if a key value that was not allocated to a data transformer (DT) 62 before the change of the data allocation is newly allocated after the change of the data allocation, a record having the newly allocated key value is temporarily saved in the data pipe 64-P by the partitioner DT62-P (S145). Since the data transformer (DT2') 62-2' in the present example is newly added, key values are constantly newly allocated to the data transformer (DT2') 62-2'. Therefore, the partitioner DT62-P temporarily saves the records allocated to the data transformer (DT2') 62-2' in the data pipe 64-P.

In the present example, if a key value that was allocated to a data transformer (DT) 62 before the change of the data allocation is also allocated after the change of the data allocation, a record having the allocated key value is input to this data transformer (DT) 62 by the partitioner DT62-P (S145). The data transformer (DT2) 62-2 in the present example has key1 and key2 allocated thereto "before" the change of the data allocation, and has only key1 allocated thereto "after" the change of the data allocation. Therefore, the partitioner DT62-P in the present example then inputs the record having key allocated to the data transformer (DT2) 62-2 to the data transformer (DT2) 62-2.

After one or more synchronization tokens have been input, the partitioner DT62-P may check whether the collector DT62-C has received all of these one or more synchronization tokens (S155). The partitioner DT62-P in the present example checks whether the collector DT62-C has received the synchronization tokens.

The collector DT62-C provides the data pipeline manager (DPM) 40, via the data transformer manager (DTM) 50, with notification including the ID information indicating the key value of the record processed by the data transformer (DT) 62 that received the synchronization token. Furthermore, the data pipeline manager (DPM) 40 provides the notification including this ID information to the partitioner DT62-P via the data transformer manager (DTM) 50. In this way, the partitioner DT62-P can know whether the synchronization tokens have arrived at the collector DT62-C.

The partitioner DT62-P may input the temporarily save record to the data transformer (DT) 62, in response to the synchronization token arriving at the collector DT62-C (S165). The partitioner DT62-P in the present example receives information indicating that the synchronization token has arrived at the collector DT62-C, and inputs the record having key2 that was temporarily saved in the data pipe 64-P to the data transformer (DT2') 62-2'. In this way, it is possible to ensure the processing order of records having key2.

Figure 3B:
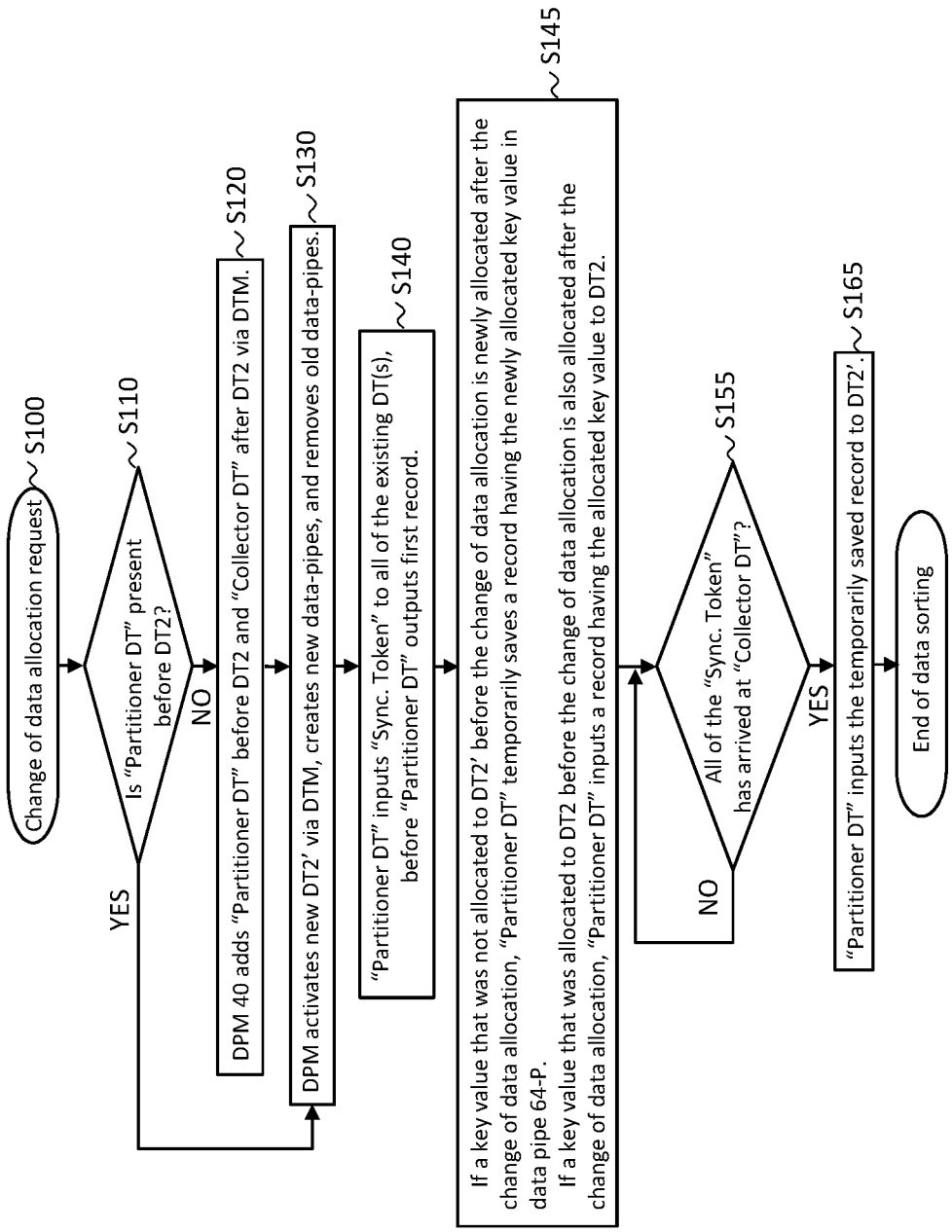
FIG. 3B shows a first modification of an operational flow for changing the data allocation according to one or more embodiments.

FIG. 3B shows a first modification of an operational flow for changing the data allocation according to one or more embodiments. Here, S100 to S140 are the same as described in FIG. 2B, and are therefore not described.

If a key value that was not allocated to the data transformer (DT2') 62-2' before the change of the data allocation is newly allocated after the change of the data allocation, the partitioner DT62-P temporarily stores the record having the newly allocated key value in the data pipe 64-P (S145). If a key value that was allocated to the data transformer (DT2) 62-2 before the change of the data allocation is also allocated after the change of the data allocation, the partitioner DT62-P inputs the record having the allocated key value to the data transformer (DT2) 62-2 (S145).

After this, the partitioner DT62-P checks whether the synchronization tokens have arrived at the collector DT62-C(S155). If all of the synchronization tokens have arrived at the collector DT62-C(YES at S155), the partitioner DT62-P inputs the temporarily saved record to the data transformer (DT2') 62-2' (S165). On the other hand, if all of the synchronization tokens have not yet arrived at the collector DT62-C(NO at S155), the collector DT62-C waits for the synchronization tokens that have not yet arrived. The partitioner DT62-P keeps the records saved while the collector DT62-C waits for the arrival of the synchronization tokens.

Figure 4:
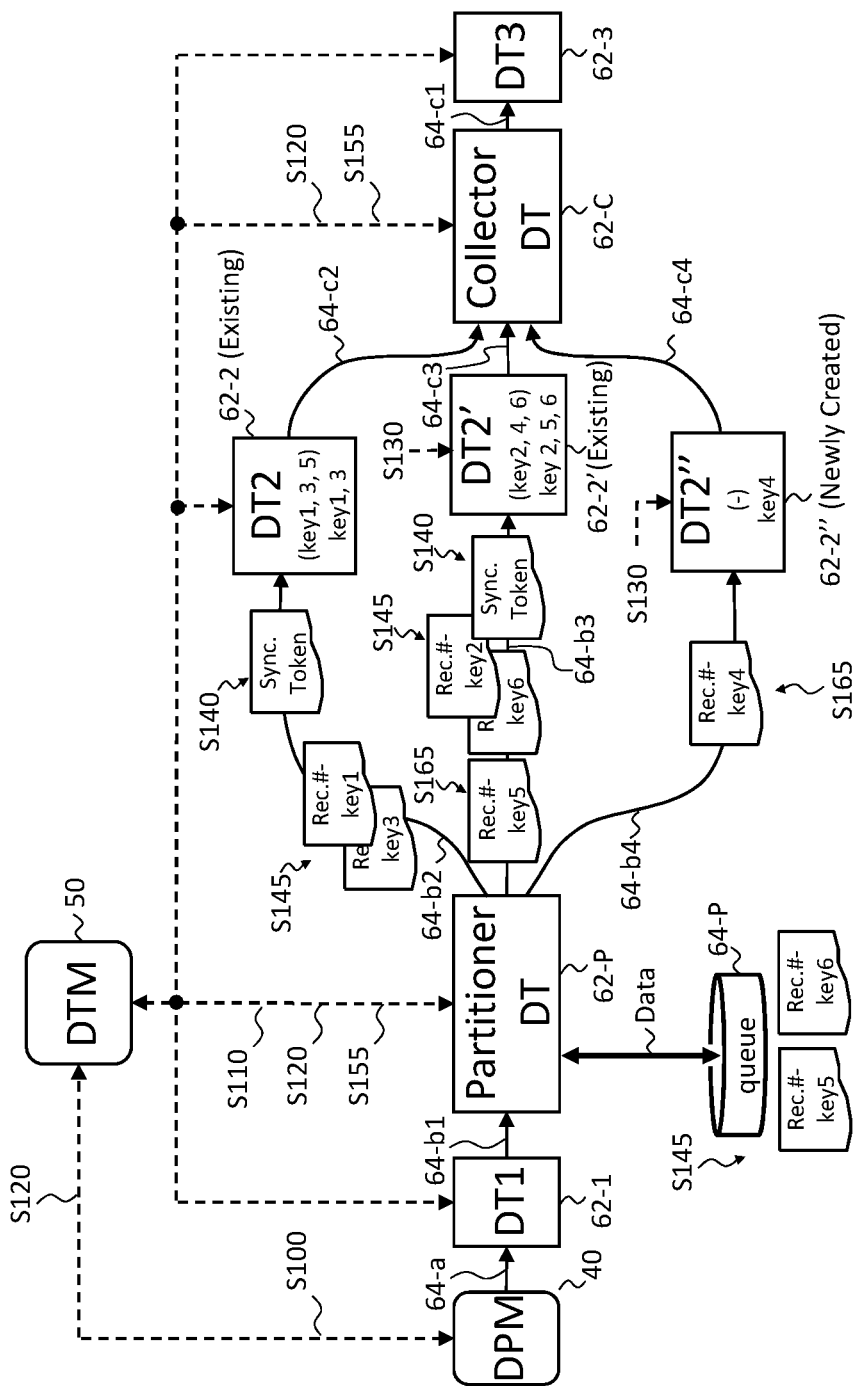
FIG. 4 shows another modification of the change of the data allocation according to one or more embodiments.

FIG. 4 shows another modification of the change of the data allocation according to one or more embodiments. The present example differs from the example shown in FIG. 3A and FIG. 3B in that there are six key values from key1 to key6 and DT2" is included in addition to DT2'. Therefore, the processes of FIG. 3B can also be applied in the present example.

The key values shown in parentheses for DT2, DT2', and DT2" in FIG. 4 indicate key values allocated before the change of the data allocation. Furthermore, the key values shown directly below these key values shown in parentheses indicate the key values allocated after the change of the data allocation. The processing order in each DT need only be ensured for identical key values, and therefore the numerical values indicating the processing order of records in FIG. 4 are omitted by being shown as a bar (–).

The present example corresponds to the third example described above. As described in FIG. 3A and FIG. 3B, the partitioner DT62-P includes its own dedicated data pipe 64-P, and the partitioner DT62-P temporarily stores records having the key value newly allocated to the data transformer (DT) 62 in the data pipe 64-P. The present example differs from the third example with regard to this point. "Table 3" described above can be referenced as the example of the data allocation.

No records are newly allocated to the data transformer (DT2) 62-2 in the present example after the change of the data allocation. The records having key1 and key3 are also allocated to the data transformer (DT2) 62-2 in the present example after the change of the data allocation. Therefore, the partitioner DT62-P inputs the records having key1 and key3 to the data transformer (DT2) 62-2 without saving these records in the data pipe 64-P (S145).

Furthermore, the records having key5 are newly allocated to the data transformer (DT2) 62-2 in the present example instead of the records having key4 after the change of the data allocation, and the records having key2 and key6 are also allocated to the data transformer (DT2) 62-2 after the change of the data allocation. Therefore, the partitioner DT62-P temporarily stores the records having key5 in the data pipe 64-P and inputs the records having key1 and key3 to the data transformer (DT2') 62-2' (S145).

Furthermore, the records having key4 are allocated first to the data transformer (DT2") 62-2" in the present example after the change of the data allocation. Therefore, the partitioner DT62-P temporarily saves the records having key4 (S145). After this, the partitioner DT62-P checks whether the synchronization tokens have arrived at the collector DT62-C(S155).

In the present example, if all of the synchronization tokens have arrived at the collector DT62-C(YES at S155), the partitioner DT62-P inputs the records having key5 that were temporarily stored into the data transformer (DT2') 62-2' and, in the same manner, inputs the records having key4 that were temporarily stored into the data transformer (DT2") 62-2" (S165). Of course, if all of the synchronization tokens have not yet arrived at the collector DT62-C(NO at S155), the collector DT62-C waits for the synchronization tokens that have not yet arrived. The partitioner DT62-P keeps the records having key4 and key5 saved while the collector DT62-C waits for the arrival of the synchronization tokens. In this way, it is possible to ensure the processing order of the records having key4 and key5.

The present example in which the partitioner DT62-P temporarily stores the records using the data pipe 64-P may be applied to the first, second, or fourth example described above, or may be applied to a combination of any two or more of the four examples described above. Furthermore, the present example may be executed by one computer (e.g. a server) or may be executed among different computers.

Figure 5A:
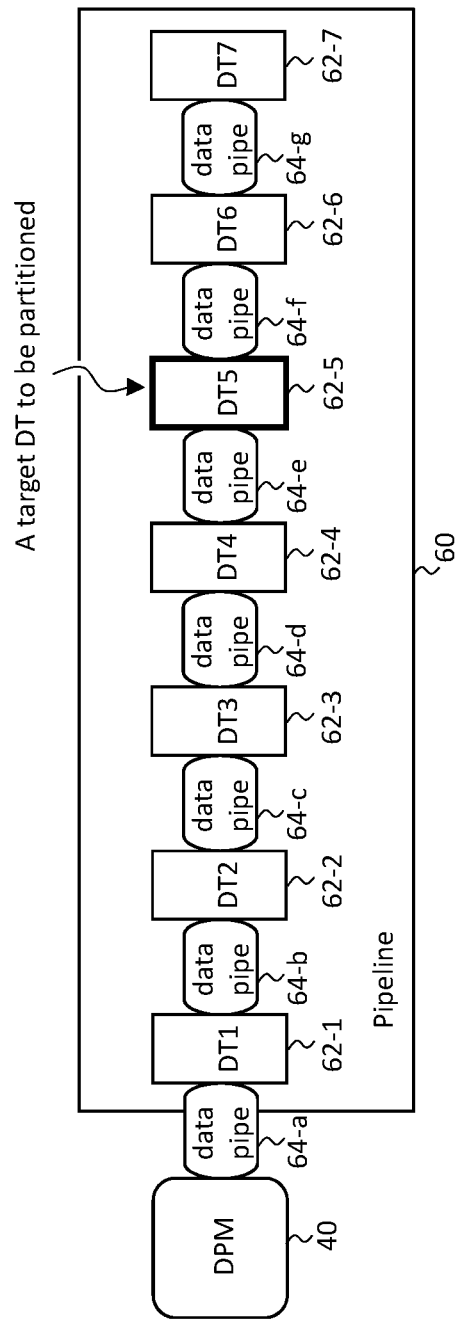
FIG. 5A shows a data pipeline according to a first experimental example in accordance with one or more embodiments.

FIG. 5A shows a data pipeline 60 according to a first experimental example. In the present experimental example, the experimental data pipeline 60 was configured by connecting seven data transformers (DT) 62 in series. The times needed for each data transformer (DT) 62 to process one record were as follows. DT1: 15 ms (ms means milliseconds here and in the following), DT2: 7 ms, DT3: 168 ms, DT4: 300 ms, DT5: 4,651 ms, DT6: 20 ms, and DT7: 16 ms. In other words, the total processing time is 5,177 ms when one record is input to the experimental data pipeline 60. The processing time of each data transformer (DT) 62 is a measured value of the execution time for each data transformer (DT) 62.

Despite being an experiment, actual medical information cannot be used due to information privacy concerns. Therefore, in the first experimental example, each data transformer (DT) 62 is made to repeat a random number calculation until the predetermined processing time of each data transformer (DT) 62 described above has passed. In the first experimental example, DT5 has the longest processing time from among the seven data transformers (DT) 62. Therefore, DT5 was designated in advance as a target to be partitioned.

In the first experimental example, the system 100 was configured using a Linux® VM (Virtual Machine) provided with a CPU using one core and 3 GB (gigabytes) of memory. Here, 30 records were input to the data pipeline 60 at 2-second intervals. The 30 records were each made to include a different key value. A hash-partitioner was used as the partitioner DT62-P.

Figure 5B:
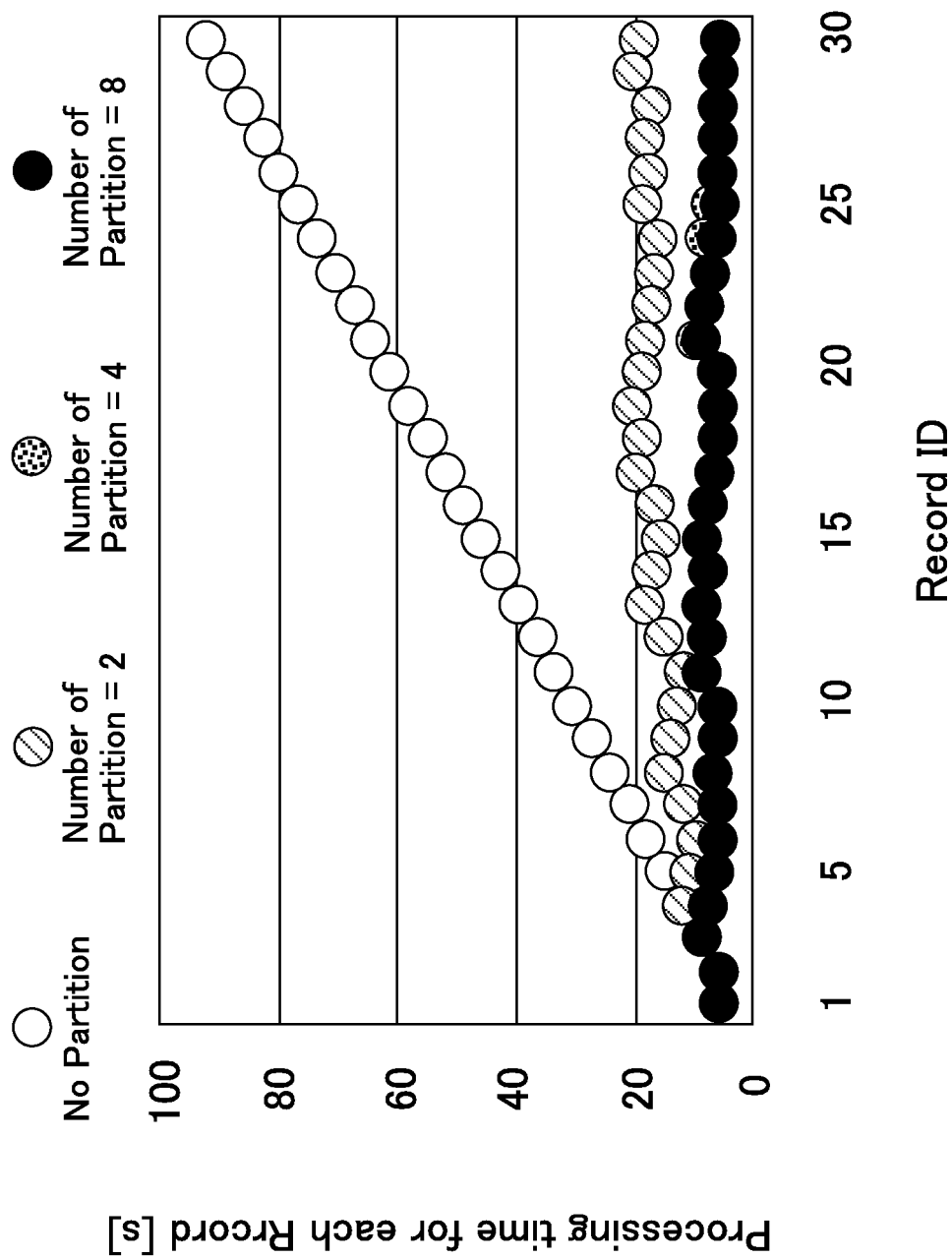
FIG. 5B shows data processing times according to the first experimental example in accordance with one or more embodiments.

FIG. 5B shows data processing times according to the first experimental example. The vertical axis indicates the processing time(s) for each record, and the horizontal axis indicates the ID of each record. Since each record has a different key value, the record IDs were set from 1 to 30 according to the order in which the records were input to the experimental data pipeline 60.

The descriptive numbers above the graph indicate the number of partitions in DT5. For example, in the "No Partition" case, approximately 20 s (seconds) were required to finish the processing of the record ID 7 in the experimental data pipeline 60. Furthermore, "No Partition" indicates a case where a data transformer (DT) 62 was not newly added to DT5. In other words, "No Partition" indicates a case where the data is processed with the data pipeline 60 configured as-is. When the number of partitions is 2, 4, and 8, DT5', DT5", DT5''', etc. that are newly added in parallel with the existing DT5 each had the same processing time. In the first experimental example, the number of partitions was determined before inputting data to the experimental data pipeline 60, without dynamically changing the number of partitions according to the record processing state.

As described above, DT5 requires 4,651 s to process one record. If the number of partitions in DT5 is 2, it is possible to process one record every 2.3255 s (=4.651 s/2). It should be noted that one record is input into the experimental data pipeline 60 every 2 seconds in the first experimental example. Therefore, in the case where the number of partitions is 2, the processing time increases gradually as the records are input.

On the other hand, although not shown, if the number of partitions in DT5 is 3, it is possible to process one record every 1.550 s (=4.651 s/3). Therefore, if the number of partitions is at least 3, it is possible to prevent the processing time from increasing gradually as the records are input. Actually, if the number of partitions in DT5 is 4 or 8, the processing time for each record was close to 5,177 ms.

Figure 5C:
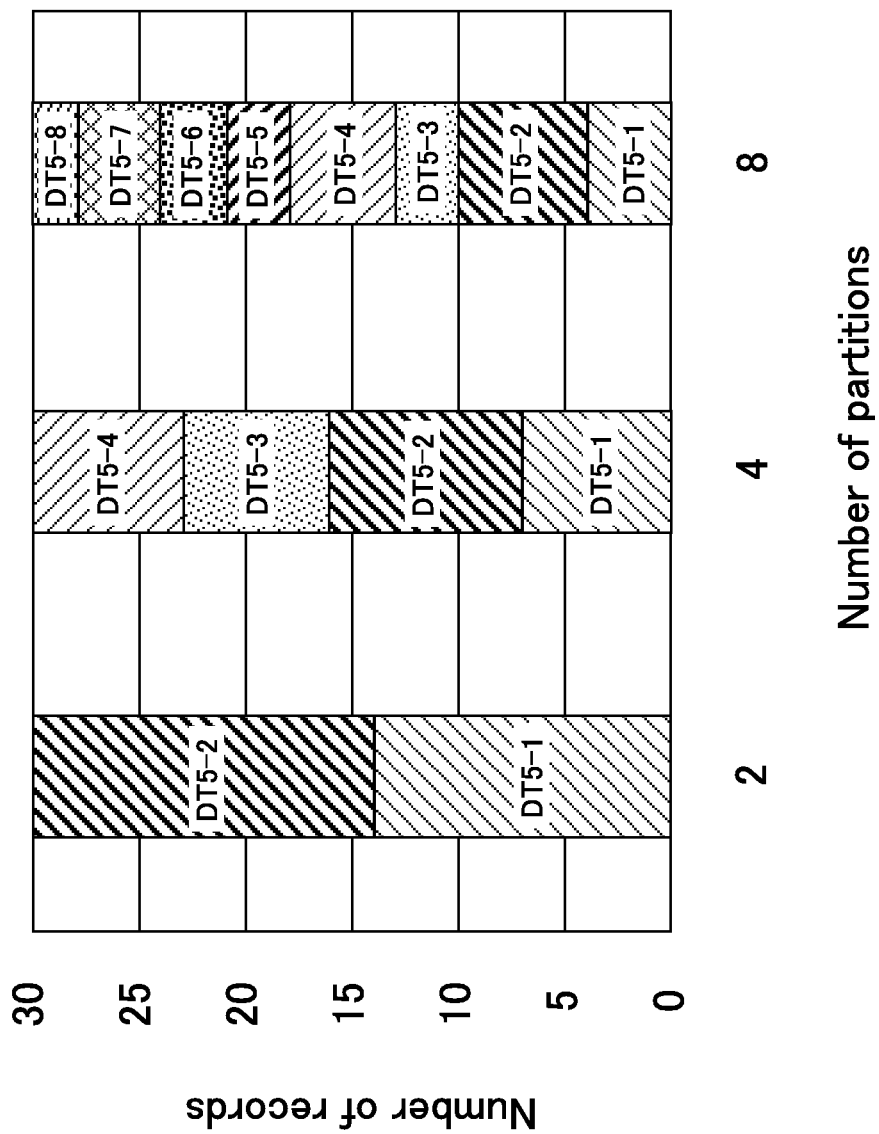
FIG. 5C shows the number of pieces of data allocated to the data transformers (DT) provided in parallel according to the first experimental example in accordance with one or more embodiments.

FIG. 5C shows the number of pieces of data allocated to the data transformers (DT) 62 provided in parallel according to the first experimental example. The vertical axis indicates the number of records, and the horizontal axis indicates the number of partitions. FIG. 5C shows how the hash-partitioner allocates the records to the plurality of data transformers DT5 provided in parallel. Here, DT5-1 corresponds to DT5, DT5-2 corresponds to DT5', DT5-3 corresponds to DT5", and DT5-4 corresponds to DT5''' (the same is true hereinafter).

Figure 6:
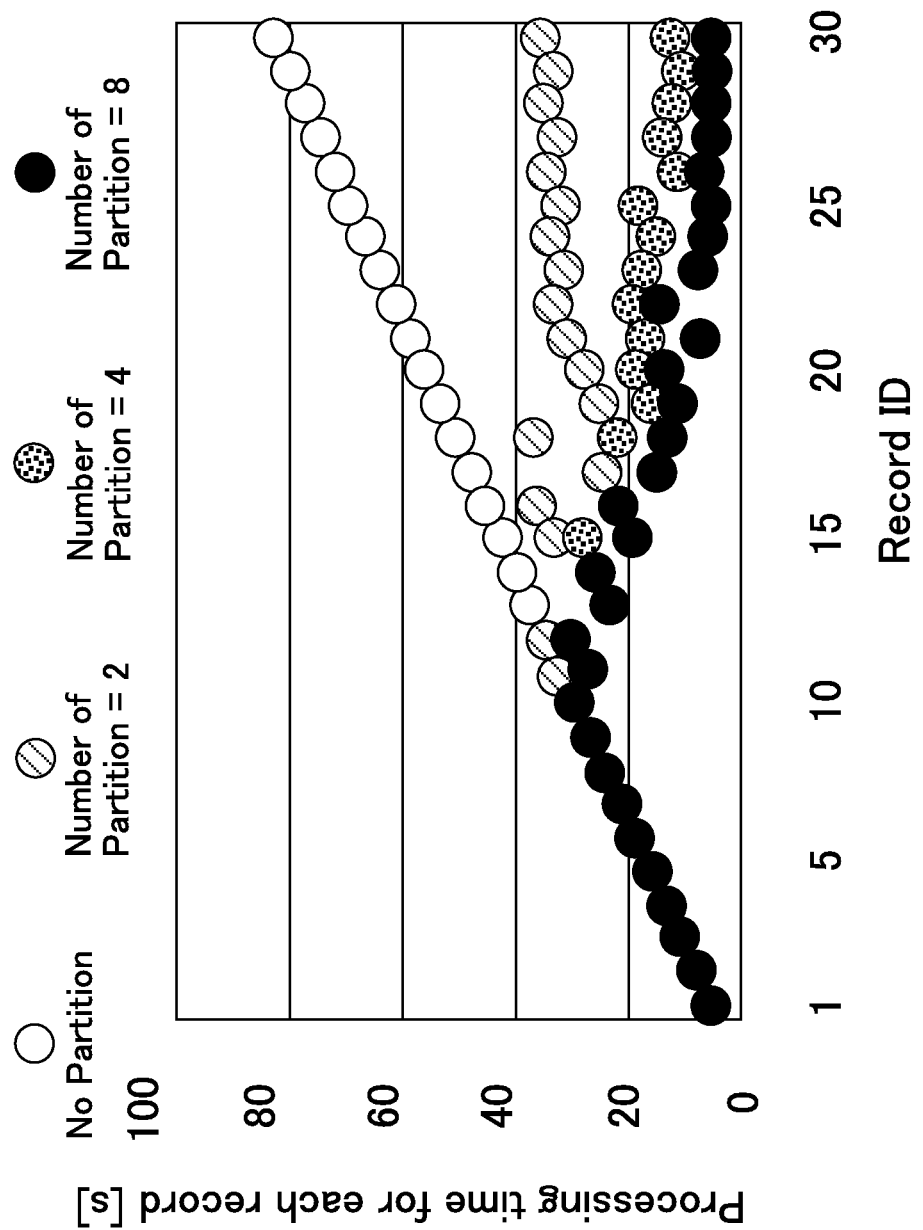
FIG. 6 shows the data processing time in a case where the data allocation is changed in response to a data backlog in a data pipe according to a second experimental example in accordance with one or more embodiments.

FIG. 6 shows the data processing time in a case where the data allocation is changed in response to a data backlog in a data pipe 64, according to a second experimental example. The vertical axis indicates the record processing time [s], and the horizontal axis indicates each record ID. In the second experimental example, as described in FIG. 2A, the data transformers (DT) 62 monitor the record processing state. The number of partitions in DT5 was dynamically changed according to the record processing state. When a backlog of five records occurred in the data pipe 64-*e* supplying data to DT5, the number of partitions was changed. The second experimental example differs from the first experimental example with regard to this point.

In the second experimental example, there was a backlog of five records in the data pipe 64-*e* at the timing when the ninth record (record ID 9) arrived at DT5. Therefore, when changing the number of partitions, the records from the ninth record and onward were input to a plurality of the data transformers DT5 provided in parallel.

As described above, if the number of partitions is 2, the throughput of the experimental data pipeline 60 drops below the arrival time of one record. Therefore, when the number of partitions was 2, the record processing time gradually increased, particularly from record ID 20 and onward. On the other hand, when the number of partitions was 4 or 8, the processing time for each record gradually decreased as the records were input. In the case where the number of partitions was 8, the standby time became 0 ms at the $25^{th}$ record and remained at approximately 0 ms for the following records. In this way, the usefulness of dynamically changing the number of partitions according to the record processing state was shown.

Figure 7:
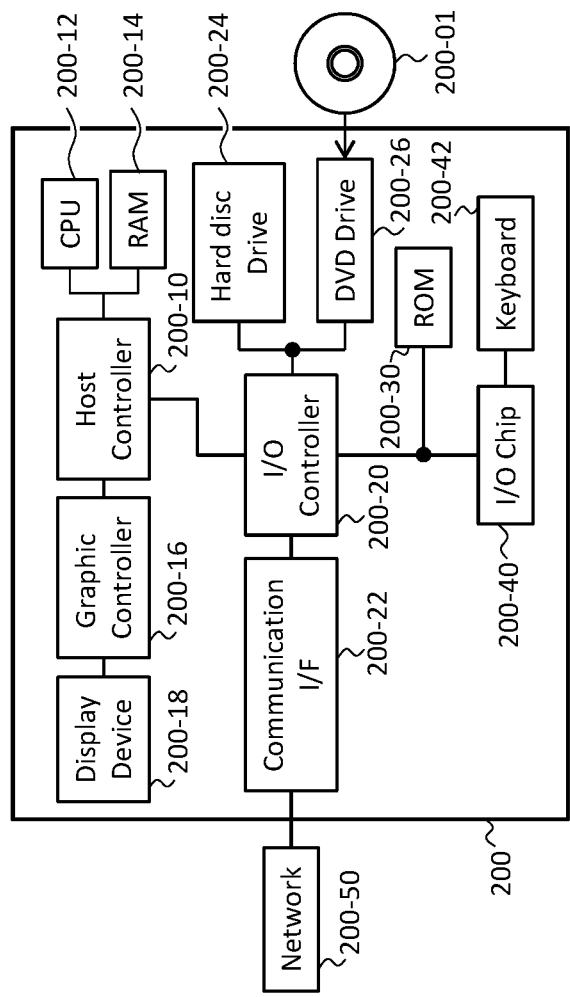
FIG. 7 shows an exemplary hardware configuration of a computer configured for cloud service utilization according to one or more embodiments.

FIG. 7 shows an exemplary hardware configuration of a computer configured for cloud service utilization, according to an embodiment of the present invention. A program that is installed in the computer 200 can cause the computer 200 to function as or perform operations associated with apparatuses of the embodiments of the present invention or one or more sections (including modules, components, elements, etc.) thereof, and/or cause the computer 200 to perform processes of the embodiments of the present invention or steps thereof. Such a program may be executed by the CPU 200-12 to cause the computer 200 to perform certain operations associated with some or all of the blocks of flowcharts and block diagrams described herein.

The computer 200 according to the present embodiment includes a CPU 200-12, a RAM 200-14, a graphics controller 200-16, and a display device 200-18, which are mutually connected by a host controller 200-10. The computer 200 also includes input/output units such as a communication interface 200-22, a hard disk drive 200-24, a DVD-ROM drive 200-26 and an IC card drive, which are connected to the host controller 200-10 via an input/output controller 200-20. The computer also includes legacy input/output units such as a ROM 200-30 and a keyboard 200-42, which are connected to the input/output controller 200-20 through an input/output chip 200-40.

The CPU 200-12 operates according to programs stored in the ROM 200-30 and the RAM 200-14, thereby controlling each unit. The graphics controller 200-16 obtains image data generated by the CPU 200-12 on a frame buffer or the like provided in the RAM 200-14 or in itself, and causes the image data to be displayed on the display device 200-18.

The communication interface 200-22 communicates with other electronic devices via a network 200-50. The hard disk drive 200-24 stores programs and data used by the CPU 200-12 within the computer 200. The DVD-ROM drive 200-26 reads the programs or the data from the DVD-ROM 200-01, and provides the hard disk drive 200-24 with the programs or the data via the RAM 200-14. The IC card drive reads programs and data from an IC card, and/or writes programs and data into the IC card.

The ROM 200-30 stores therein a boot program or the like executed by the computer 200 at the time of activation, and/or a program depending on the hardware of the computer 200. The input/output chip 200-40 may also connect various input/output units via a parallel port, a serial port, a keyboard port, a mouse port, and the like to the input/output controller 200-20.

A program is provided by computer readable media such as the DVD-ROM 200-01 or the IC card. The program is read from the computer readable media, installed into the hard disk drive 200-24, RAM 200-14, or ROM 200-30, which are also examples of computer readable media, and executed by the CPU 200-12. The information processing described in these programs is read into the computer 200, resulting in cooperation between a program and the above-mentioned various types of hardware resources. An apparatus or method may be constituted by realizing the operation or processing of information in accordance with the usage of the computer 200.

For example, when communication is performed between the computer 200 and an external device, the CPU 200-12 may execute a communication program loaded onto the RAM 200-14 to instruct communication processing to the communication interface 200-22, based on the processing described in the communication program. The communication interface 200-22, under control of the CPU 200-12, reads transmission data stored on a transmission buffering region provided in a recording medium such as the RAM 200-14, the hard disk drive 200-24, the DVD-ROM 200-01, or the IC card, and transmits the read transmission data to network 200-50 or writes reception data received from network 200-50 to a reception buffering region or the like provided on the recording medium.

In addition, the CPU 200-12 may cause all or a necessary portion of a file or a database to be read into the RAM 200-14, the file or the database having been stored in an external recording medium such as the hard disk drive 200-24, the DVD-ROM drive 200-26 (DVD-ROM 200-01), the IC card, etc., and perform various types of processing on the data on the RAM 200-14. The CPU 200-12 may then write back the processed data to the external recording medium.

Various types of information, such as various types of programs, data, tables, and databases, may be stored in the recording medium to undergo information processing. The CPU 200-12 may perform various types of processing on the data read from the RAM 200-14, which includes various types of operations, processing of information, condition judging, conditional branch, unconditional branch, search/replace of information, etc., as described throughout this disclosure and designated by an instruction sequence of programs, and writes the result back to the RAM 200-14. In addition, the CPU 200-12 may search for information in a file, a database, etc., in the recording medium. For example, when a plurality of entries, each having an attribute value of a first attribute is associated with an attribute value of a second attribute, are stored in the recording medium, the CPU 200-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 200. In addition, a recording medium such as a hard disk or a RAM provided in a server system connected to a dedicated communication network or the Internet can be used as the computer readable media, thereby providing the program to the computer 200 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy (registered trademark) disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, with the embodiments of the present invention, it is possible to change the allocation of data in a data pipeline by using a synchronization token.

The invention claimed is:
1. A method of operating a system that processes data in parallel, the method comprising:
inputting a synchronization token into at least one data processing module that is in an operational state from among data processing modules provided in parallel, in response to a request to change allocation of the data;
changing the allocation of the data to the data processing modules provided in parallel, after the synchronization token is input, two or more of the data processing modules being configured for processing in parallel; and
in response to the synchronization token having arrived at a data processing module that receives data at a later stage than the at least one data processing module into which the synchronization token was input, processing data for which processing has been stopped by the at least one data processing module among the data processing modules after the synchronization token is input to the at least one data processing module;
wherein respective pieces of data are provided with key values indicating groups to which the respective pieces of data belong;
wherein an order in which one or more pieces of data in each of one or more of the groups are to be processed within each of the groups is determined; and
wherein the key values are allocated to every single data processing module that processes data among the data processing modules provided in parallel.
2. The method according to claim 1, wherein a given data processing module, to which a key value that was not allocated before the change of the data allocation but is newly allocated after the change of the data allocation, stops processing data; and
wherein the given data processing module, to which a key value that was not allocated before the change of the data allocation but is not newly allocated after the change of the data allocation, remains in the operational state.

3. The method according to claim 2, wherein a newly added one or more data processing modules are further added in parallel with the data processing modules provided in parallel, in response to the request to change the allocation of the data; and wherein the synchronization token is input to all of the data processing modules that already exist.

4. The method according to claim 3, wherein if the allocation of the data is changed by allocating some key values among a plurality of key values processed by the existing data processing modules provided in parallel to the newly added one or more data processing modules:

the existing data processing modules provided in parallel remain in the operational state of being able to process data, and the newly added one or more added data processing modules do not start the data processing until the synchronization token arrives at a later data processing module that receives data provided at a later stage than the existing data processing modules provided in parallel.

5. The method according to claim 2, wherein the data processing modules provided in parallel include a first data processing module and a second data processing module, the first data processing module and the second data processing module are in the operational state, and some of the key values corresponding to the first data processing module are newly allocated as key values corresponding to the second data processing module; and wherein the synchronization token is input to both the first data processing module and the second data processing module.

6. The method according to claim 5, wherein the second data processing module does not start processing data until the synchronization token arrives at some later data processing module that receives data at a later stage than the second data processing module.

7. The method according to claim 6, wherein the first data processing module remains in the operational state of being able to process data.

8. The method according to claim 2, wherein the data processing modules provided in parallel include a first data processing module and a second data processing module, and the allocation of the data is changed by newly allocating some of the key values corresponding to the first data processing module operating on a first computer as key values corresponding to the second data processing module operating on a second computer that is different from the first computer.

9. The method according to claim 2, wherein a plurality of key values allocated to a first number of data processing modules provided in parallel are newly allocated as key values corresponding to a second number of data processing modules, the second number of data processing modules being less than the first number of data processing modules; and wherein the synchronization token is input to all of the second number of data processing modules.

10. A method of operating a system that processes data in parallel, the method comprising:

inputting a synchronization token into at least one data processing module that is in an operational state from among data processing modules provided in parallel, in response to a request to change allocation of the data;

changing the allocation of the data to the data processing modules provided in parallel, after the synchronization token is input, two or more of the data processing modules being configured for processing in parallel; and in response to the synchronization token having arrived at a data processing module that receives data at a later stage than the at least one data processing module into which the synchronization token was input, processing data for which processing has been stopped by the at least one data processing module among the data processing modules after the synchronization token is input to the at least one data processing module;

wherein respective pieces of data are provided with key values indicating groups to which the respective pieces of data belong, an order in which one or more pieces of data in each of one or more of the groups are to be processed within each of the groups is determined, and the key value is allocated to every single data processing module that processes data among the data processing modules provided in parallel;

wherein if a key value that is not allocated to a first data processing module before the change of the data allocation is newly allocated after the change of the data allocation, data including the newly allocated key value is temporarily stored as temporary saved data; and wherein if a key value that is allocated to the first data processing module before the change of the data allocation is also allocated after the change of the data allocation, data including the key value having been allocated is input to the first data processing module.

11. The method according to claim 10, wherein in response to the synchronization token having arrived at a later data processing module that receives data at a later stage than the at least one data processing module into which the synchronization token was input, the temporarily saved data is input to the first data processing module.

* * * * *